(12) United States Patent
Williamson

(10) Patent No.: US 10,421,656 B2
(45) Date of Patent: Sep. 24, 2019

(54) ELECTRICAL CONTROL PANEL FOR FUELING COMPONENTS

(71) Applicant: Hill Phoenix, Inc., Conyers, GA (US)

(72) Inventor: Donald E. Williamson, Conyers, GA (US)

(73) Assignee: Hill Phoenix, Inc., Conyers, GA (US)

(*) Notice: Subject to any disclaimer, the term of this patent is extended or adjusted under 35 U.S.C. 154(b) by 260 days.

(21) Appl. No.: 15/659,029

(22) Filed: Jul. 25, 2017

(65) Prior Publication Data
US 2019/0031495 A1 Jan. 31, 2019

(51) Int. Cl.
| *F02D 41/22* | (2006.01) |
| *B67D 7/08* | (2010.01) |
| *B67D 7/04* | (2010.01) |
| *B67D 7/62* | (2010.01) |
| *B67D 7/70* | (2010.01) |
| *H02H 3/06* | (2006.01) |
| *F02D 41/30* | (2006.01) |
| *H02H 3/10* | (2006.01) |

(52) U.S. Cl.
CPC ........... *B67D 7/08* (2013.01); *B67D 7/04* (2013.01); *B67D 7/62* (2013.01); *B67D 7/70* (2013.01); *F02D 41/22* (2013.01); *F02D 41/3082* (2013.01); *H02H 3/06* (2013.01); *H02H 3/105* (2013.01)

(58) Field of Classification Search
USPC .............................. 361/93.7–93.9, 103, 106
See application file for complete search history.

(56) References Cited

U.S. PATENT DOCUMENTS

| 4,036,403 A | 7/1977 | Barnes et al. |
| 5,874,787 A | 2/1999 | Meyer et al. |
| 6,157,096 A | 12/2000 | Vinciguerra |
| 6,158,618 A * | 12/2000 | Mercer .................... B67D 7/04 222/25 |
| 6,808,087 B1 | 10/2004 | Ford |
| 8,030,803 B1 | 10/2011 | Ford |
| 2015/0148942 A1 | 5/2015 | DeWitt et al. |

OTHER PUBLICATIONS

Emergency Stop (E-Stop) Systems, Providing Compliant Disconnects for Fueling Dispensers, available Jun. 23, 2009, 5 pps.

* cited by examiner

*Primary Examiner* — Danny Nguyen
(74) *Attorney, Agent, or Firm* — Foley & Lardner LLP

(57) ABSTRACT

A fuel dispensing system includes a plurality of fuel dispensers, at least one tank configured to store fuel, at least one pump configured to pump the fuel from the tank to at least one of the fuel dispensers, and a fuel panel assembly configured to supply electric power to each of the fuel dispensers. The fuel panel assembly includes a plurality of overcurrent protection breakers, each overcurrent protection breaker provided for one of the fuel dispensers. The fuel panel assembly further includes a plurality of disconnect devices, each disconnect device provided for one of the fuel dispensers. The fuel panel assembly is provided within a single control panel enclosure.

13 Claims, 2 Drawing Sheets

ELECTRICAL CONTROL PANEL FOR FUELING COMPONENTS

BACKGROUND

Fuel dispensers of a fuel dispensing system are generally provided at a gas station for providing fuel, such as gasoline, to customers. A fuel dispensing system may have several fuel dispensers to accommodate more than one customer at a time. The system may also include nozzles for dispensing gas from a storage tank, a motor drive, and other electrical/electronic devices and systems to facilitate operation, such as an electric fuel panel assembly.

In general, fueling dispensing systems are configured to meet certain NEC requirements and other safety regulations concerning dispensing of fuel. One requirement may relate to circuit disconnecting provisions, whereby all circuits electrically connected to a dispenser must be provided with a means to simultaneously disconnect each conductor. Another requirement may relate to provisions for maintenance and service, whereby each dispenser must be capable of disconnecting power and other circuits to the dispenser during maintenance.

A dispenser's power can be removed by turning off its overcurrent protection breaker, which is generally located in a panelboard adjacent to a fuel panel, or by de-energizing or physically disconnecting control power that is used to either provide power to a dispenser or disconnect it from a dispenser. Other methods utilize an upstream main contactor to remove all power from a panelboard by disconnecting its feeder wiring.

These systems typically require several wired connections. For example, a twelve-dispenser panel requires thirty-six wires to supply power for all twelve dispensers connected to the fuel panel. Each wired connection may also require an additional wiring terminal. Installation and maintenance can be time-consuming, costly, and an inefficient use of space.

SUMMARY

One implementation of the present disclosure is a fuel dispensing system. The fuel dispensing system includes a plurality of fuel dispensers, at least one tank configured to store fuel, at least one pump configured to pump the fuel from the tank to at least one of the fuel dispensers, and a fuel panel assembly configured to supply electric power to each of the fuel dispensers. The fuel panel assembly includes a plurality of overcurrent protection breakers, each overcurrent protection breaker provided for one of the fuel dispensers. The fuel panel assembly further includes a plurality of disconnect devices, each disconnect device provided for one of the fuel dispensers. The fuel panel assembly is provided within a single control panel enclosure.

Another implementation of the present disclosure is a fuel panel assembly configured to supply electric power to each of a plurality of fuel dispensers. The fuel panel assembly includes a plurality of overcurrent protection breakers, each overcurrent protection breaker provided for one of the fuel dispensers. The fuel panel assembly further includes a plurality of disconnect devices, each disconnect device provided for one of the fuel dispensers. The fuel panel assembly is provided within a single control panel enclosure.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a fuel dispensing system is shown, according to some embodiments. The fuel dispensing system can be implemented in a gas station with one or more fuel dispensers for dispensing fuel to customers. In some embodiments, the fuel dispensing system includes a fuel panel assembly configured to receive a power supply from a main service. The fuel panel assembly is configured to make or break a power supply connection to each of a plurality of fuel dispensers. The fuel panel assembly may include one or more overcurrent protection breakers, a dispenser disconnect, and a system disconnect. The fuel panel assembly can be provided within a single control panel enclosure.

Fuel Dispensing System

Figure 1:
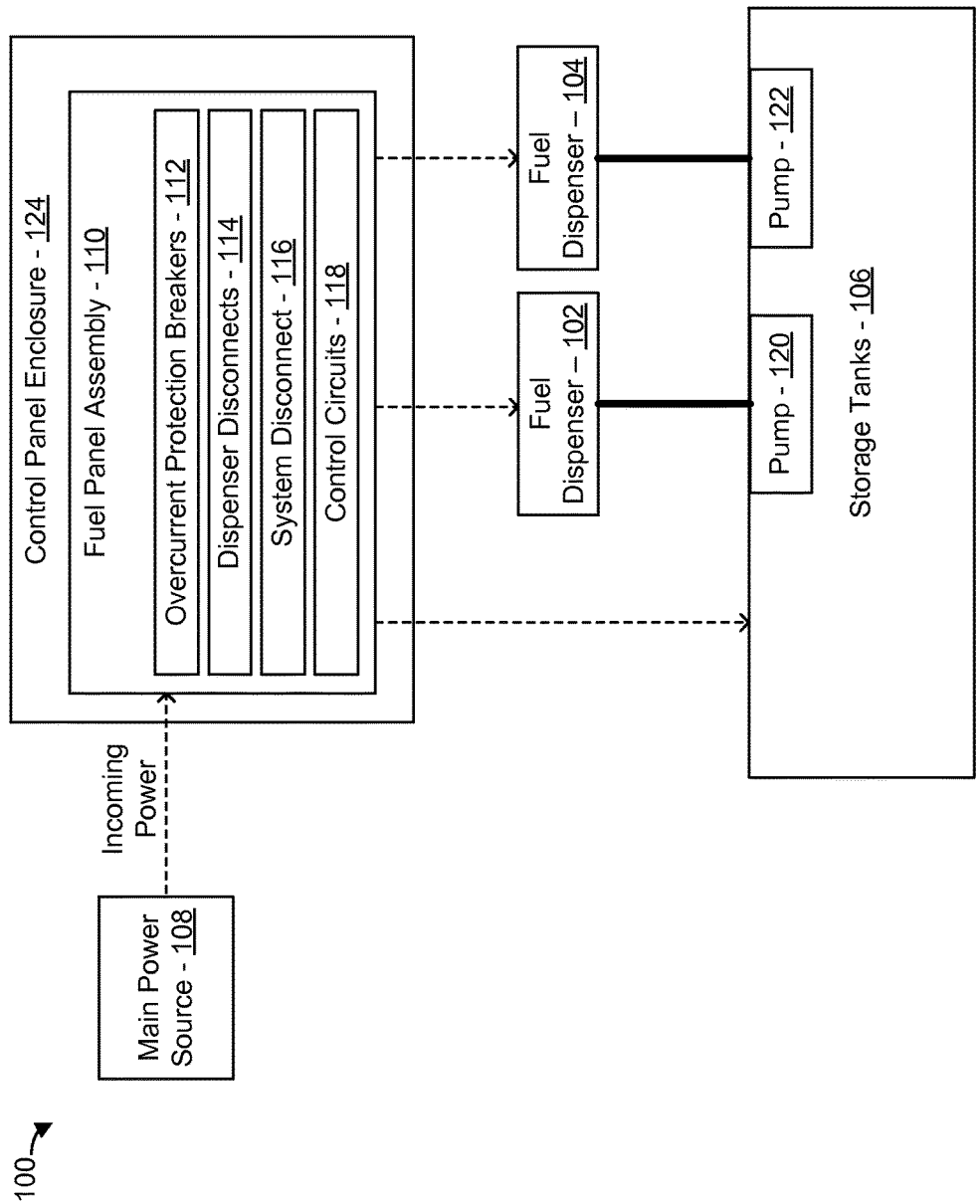
FIG. 1 is a block diagram of a fuel dispensing system, according to an exemplary embodiment.

Referring to FIG. 1 a fuel dispensing system 100 is shown schematically according to an exemplary embodiment. In some embodiments, fuel dispensing system 100 is provided in a gas or refueling station. The gas station can provide various fueling products, such as gasoline, to customers. A customer can receive fueling products from fuel dispenser 102 and fuel dispenser 104. Although the fuel dispensing system 100 is shown to include two fuel dispensers 102, 104, other embodiments can include any number of fuel dispensers, such as eight or twelve dispensers. Each of fuel dispensers 102, 104 may include one or more fuel hoses with one end terminating at a nozzle to facilitate dispensing fuel through the hose.

Fuel dispensing system 100 is shown to include at least one storage tank 106. Storage tank 106 is generally configured to receive and store fueling products in bulk. In some embodiments, storage tank 106 is located underground. Any number of storage tanks 106 can be provided. For example, in some embodiments, one storage tank 106 can be provided for each fueling product and/or for each of fuel dispensers 102, 104.

Storage tank 106 is generally configured to provide its stored fueling product to fuel dispensers 102, 104. In this regard, storage tank 106 is generally configured to be electrically and hydraulically connected to fuel dispensers 102, 104. For example, storage tank 106 is shown to include pumps 120, 122, which are generally configured to control fuel delivery from storage tank 106 to fuel dispensers 102, 104. Pumps 120, 122 can be each hydraulically connected to fuel dispensers 102, 104 respectively via a set of fuel piping. Pumps 120, 122 can be configured to directly receive their power from fuel panel assembly 110. Although fuel dispensing system 100 is shown to include two pumps 120, 122, embodiments can include any number of pumps. For example, in some embodiments fuel dispensing system 100 is configured to include one pump for each dispenser in a storage tank.

Fuel dispensing system 100 is shown to include a fuel panel assembly 110. In some embodiments, fuel panel assembly 110 is configured to receive an incoming power supply from a main power source 108. Fuel panel assembly 110 is generally configured to supply power to each of fuel dispensers 102, 104. In some embodiments, the supplied power to each of fuel dispensers 102, 104 is provided via three conductors corresponding to a live conductor, a neutral conductor, and a ground conductor. In some embodiments, fuel panel assembly 110 is also configured to selectively de-energize fuel dispenser 102 and/or fuel dispenser 104 by simultaneously disconnecting each of the three conductors.

Fuel dispensing system 100 can be configured to receive any type of power supply. For example, in some embodiments, fuel panel assembly 110 can be configured to receive a three-phase, two-hundred and forty volt power supply. The received power supply can be provided through five conductors including a dedicated neutral (grounded) conductor and a dedicated ground (grounding) conductor. In other embodiments, fuel panel assembly 110 can be configured to receive a single-phase, one hundred and twenty volt power supply. In some embodiments, the type of received power supply depends on the rating and configuration of the main power source 108.

Fuel panel assembly 110 can be configured to include various electrical components for supplying power to each of fuel dispensers 102, 104. For example, fuel dispenser 102 can include terminal strips for wiring connections. The wiring connections may relate to received power supply from main power source 108 and/or supplied power to fuel dispenser 102. Each of fuel dispensers 102, 104 can also include insulated or non-insulated wire, connectors, and other conventional components used in electric control panel assemblies.

Fuel panel assembly 110 can also be configured with components for providing safety-related functions or features. For example, fuel panel assembly 110 is shown to include overload current breakers 112, dispenser disconnects 114, and system disconnect 116 as further detailed below in FIG. 2. Fuel panel assembly 110 is also shown to include control circuits 118. Control circuits 118 can be generally configured to facilitate operation and/or safety functions of fuel dispensing system 100, including fuel panel assembly 110. For example, control circuits 118 can include a programmable logical controller, a step-down transformer, switches, relays, wired and wireless interfaces, etc.

Fuel panel assembly 110 can generally be provided within a single control panel enclosure 124. In some embodiments, control panel enclosure 124 corresponds to a "deadfront" configuration. Control panel enclosure 124 may be provided with a door configured to provide access to fuel panel assembly 110 when the door is positioned opened. In some embodiments, control panel enclosure 124 corresponds to a suitable NEMA (National Electric Manufacturing Association) rating. For example, when fuel panel assembly 110 is intended to be installed in an outdoor location, control panel enclosure 124 can be configured to correspond to a 3R or 4 rating.

Control panel enclosure 124 can be configured to enclose components of fuel panel assembly 110 and facilitate electrical connections. For example, control panel enclosure 124 may have one or more overall dimensions to provide sufficient spacing between components of fuel panel assembly 110 (e.g. overload current breakers 112, dispenser disconnects 114, etc.). Control panel enclosure 124 may also include one or more cut-outs or raceways for wiring between fuel panel assembly 110 and external devices. In some embodiments, control panel enclosure 124 and/or its door is configured for mounting one or more components of fuel panel assembly 110. For example, the door can include a terminal or connector for bonding a grounding conductor.

Figure 2:
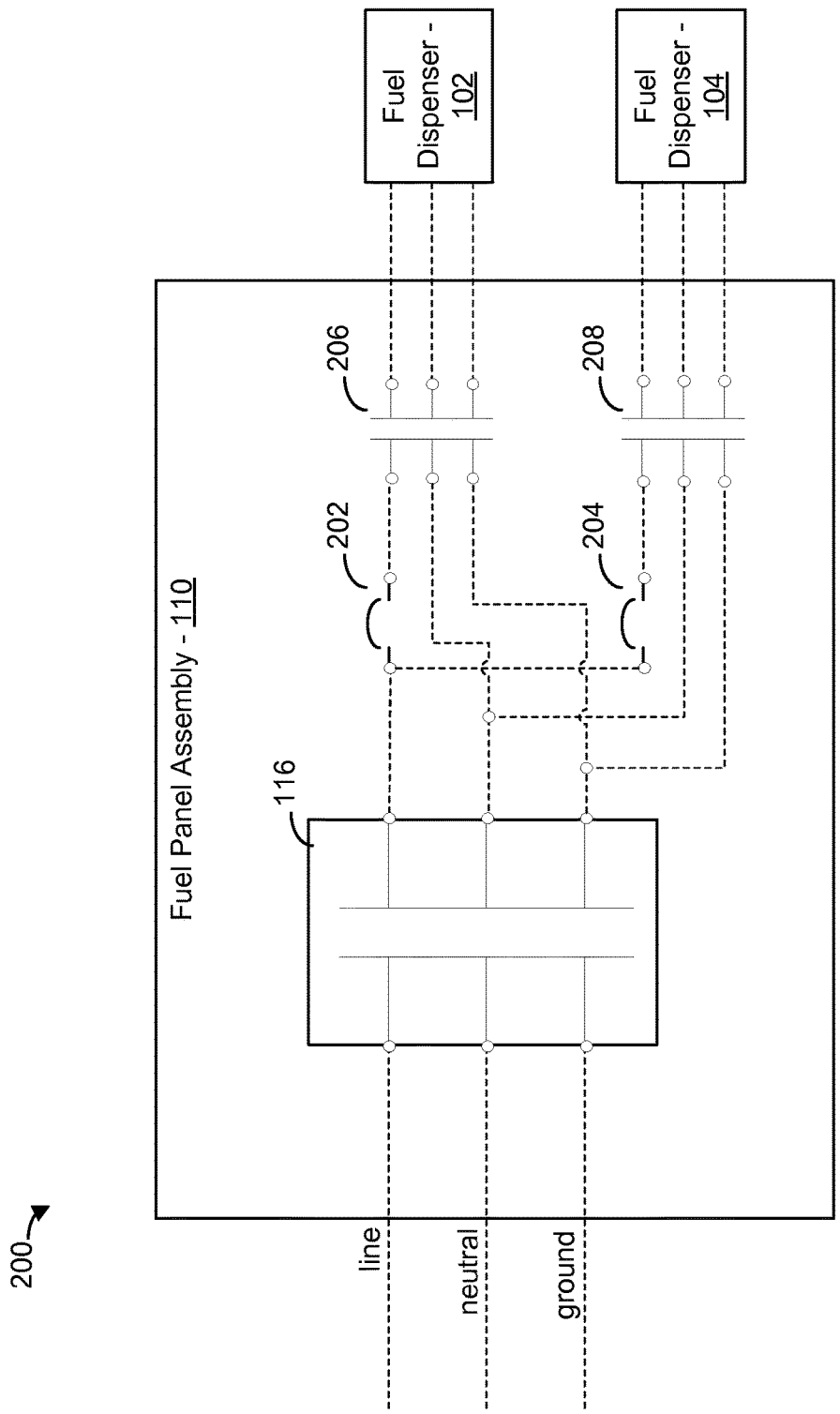
FIG. 2 is a schematic diagram showing electrical connections of a fuel panel assembly of the fuel dispensing system of FIG. 1, according to an exemplary embodiment.

Referring now to FIG. 2, a schematic diagram 200 illustrates fuel panel assembly 110 of fuel dispensing system 100 in greater detail, according to an exemplary embodiment. Fuel panel assembly 110 is generally disposed within control panel enclosure 124. In particular, control panel enclosure 124 can be configured to provide a single enclosure for overload current breakers 112, dispenser disconnects 114, and system disconnect 116. In an alternate embodiment, system disconnect 116 is not provided in fuel panel assembly 110. In this embodiment, system disconnect 116 may be provided in an external control panel enclosure. Fuel panel assembly 110 can be configured to supply power to each of fuel dispensers 102, 104.

Diagram 200 shows fuel panel assembly 110 receiving an incoming power supply. Fuel panel assembly 110 can be configured to receive any power supply configuration as described above with reference to FIG. 1. For example, fuel panel assembly 110 is shown to receive three conductors corresponding to a line conductor, a neutral (grounded) conductor, and a ground (grounding) conductor. In some embodiments, system disconnect 116 is configured with a set of terminals configured to receive each conductor of the incoming power supply.

In some embodiments, fuel panel assembly 110 includes one or more terminal strips configured to facilitate one or more field wiring and/or factory wiring connections. For example, a terminal strip can be configured with a set of terminals for receiving each incoming conductor (line, neutral, ground). The terminal strip may have a suitable rating corresponding to a gauge size and current rating. Fuel panel assembly 110 can be configured with a set of conductors provided between the terminal strip and system disconnect 116, thereby allowing an electrician or installer to electrically connect the incoming power supply to system disconnect 116 via the terminal strip.

In some embodiments, system disconnect 116 is a device or circuit configured to electrically isolate fuel dispensers 102, 104 from an incoming power supply. In some embodiments, system disconnect 116 is configured to facilitate compliance with one or more safety-related requirements or regulations. For example, in some embodiments, fuel dispensing system 100 may generally be required to comply with various electric code and safety requirements. One requirement may relate to circuit disconnecting provisions, whereby all circuits electrically connected to a dispenser must be provided with a means to simultaneously disconnect each conductor.

In some embodiments, system disconnect 116 is a relay or a switching device configured to open or close a set of contacts corresponding to each conductor of the incoming power. For example, diagram 200 shows the incoming power supply provided as three conductors (line, neutral, ground). A set of contacts can be provided for each of the three conductors. Each set of contacts can be configured to simultaneously open and/or close in response to a control signal, such as a low voltage DC current.

In some embodiments, the control signal can be received from a switch. For example, in some embodiments, fuel panel assembly 110 is configured with a normally-open or normally-closed switch and a step-down transformer. The switch can be configured within, on, or proximate to control panel enclosure 124. For example, in some embodiments, the switch is configured through a door of control panel enclosure 124 to provide convenient access to an operator of the switch. The primary side of the step-down transformer can be electrically connected to the incoming power supply (e.g. via the terminal strip). The transformer can be configured to provide a low-voltage DC output via an output terminal electrically connected to the secondary side of the transformer. The output terminal can be electrically connected (e.g. via an insulated wire) to a first contact of the switch. A second contact of the switch can be electrically connected to system disconnect 116. In this regard, system disconnect 116 can be configured to electrically isolate dispensers 102, 104 in response to a switch position.

In some embodiments, fuel panel assembly 110 includes a programmable logic controller (not shown). The programmable logic controller can be configured to receive a user input and provide a low-voltage output signal in response to the received input. For example, the programmable logic controller can include an input terminal configured to detect a switch position or a user input. The user input can be provided via a user interface of the programmable logic controller and/or from a remote device. The programmable logic controller can include an output terminal configured to provide a low-voltage DC output in response to the user input. In this regard, system disconnect 116 can be configured to electrically isolate dispensers 102, 104 in response to input received from the programmable logic controller.

In some embodiments, system disconnect 116 is configured with a number of electrical outputs corresponding to a number of conductors provided as an input. For example, system disconnect 116 is shown to receive an incoming power supply provided as three conductors (line, neutral, ground). Accordingly, system disconnect 116 is shown to include a line output, a neutral output, and a ground output. In some embodiments, for facilitating electrical connections, the line output is electrically connected to a line bus, the neutral output is connected to a neutral bus, and the ground output is connected to a ground bus. Each of the line bus, neutral bus, and ground bus can be provided as an electrically isolated terminal strip.

Fuel panel assembly 110 is shown to include overcurrent protection breakers 202, 204 and dispenser disconnects 206, 208. Although diagram 200 is shown to include two overcurrent protection breakers 202, 204 and two dispenser disconnects 206, 208, embodiments can include more or fewer breakers and/or dispenser disconnects. For example, in some embodiments, a number of breakers and dispenser disconnects provided with fuel panel assembly 110 corresponds to a number of fuel dispensers receiving power from fuel panel assembly 110.

Each of overcurrent protection breakers 202, 204 is generally configured to directly energize its respective dispenser disconnect 206, 208 for providing power to its respective fuel dispenser 102, 104. Overcurrent protection breakers 202, 204 can be any suitable type of breaker or protective device responsive to an overcurrent condition. In some embodiments, each of overcurrent protection breakers 202, 204 is rated at twenty amps and one hundred twenty volts. Each of dispenser disconnects 206, 208 can be a relay or a switching device configured to simultaneously open or close a set of contacts corresponding to its respective fuel dispenser 102, 104.

When overcurrent protection breaker 202 is switched on, all three sets of contacts of dispenser disconnect 206 are closed, thereby allowing electric current to flow between dispenser disconnect 206 and fuel dispenser 102. For example, diagram 200 shows three conductors (line, neutral, ground) for supplying power from dispenser disconnect 206 to fuel dispenser 102. Dispenser disconnect 206 can include a set of contacts for each of the three conductors. Overcurrent protection breaker 202 can include three input terminals corresponding to line, neutral, and ground, and three output terminals corresponding to line, neutral, and ground. A line input terminal of overcurrent protection breaker 202 is electrically connected to a line output of system disconnect 116 (e.g. via the line bus). A line output terminal of overcurrent protection breaker 202 is electrically connected to a corresponding line terminal of dispenser disconnect 206.

Dispenser disconnect 206 can also include a neutral terminal electrically connected to a neutral output of system disconnect 116 and a ground terminal connected to the ground output. Dispenser disconnect 206 can be configured with three output terminals, each corresponding to line, neutral, and ground. Dispenser disconnect 206 can include a set of contacts for each of line, neutral, and ground. Each set of contacts can be configured to simultaneously open and/or close in response to a switch position of overcurrent protection breaker 202.

Each of overcurrent protection breakers 202, 204 is generally configured to simultaneously disconnect all contacts of its respective dispenser disconnect 206, 208. For example, when overcurrent protection breaker 202 is switched off, all three sets of contacts of dispenser disconnect 206 are open, thereby disconnecting power and electrical connections between dispenser disconnect 206 and fuel dispenser 102.

In an alternate embodiment (not shown), system disconnect 116 is not provided in fuel panel assembly 110. For example, system disconnect 116 may be provided in an external control panel enclosure. In this embodiment, fuel panel assembly 110 is configured such that dispenser disconnects 206, 208 perform one or more functions of system disconnect 116. For example, both dispenser disconnects 206, 208 can be configured to simultaneously disconnect all electrical connections (line, neutral, ground) to fuel dispensers 102, 104 in response to a control signal. The control signal can be provided via a normally-open or normally-closed switch, step-down transformer, and/or a programmable logic controller as described above.

According to an exemplary embodiment of FIG. 2, a fuel panel assembly 110 is provided within a single electrical control panel enclosure 124. Fuel panel assembly 110 includes an overcurrent protection breaker 202 and a dispenser disconnect 206 configured to supply power to a fuel dispenser 102, and an overcurrent protection breaker 204 and a dispenser disconnect 208 configured to supply power to a fuel dispenser 104. Overcurrent protection breaker 202 is configured to control dispenser disconnect 206 such that switching overcurrent protection breaker 202 to an off position causes dispenser disconnect 206 to disconnect all conductors electrically connected to dispenser disconnect 206 (e.g. line, neutral, ground). Similarly, overcurrent protection breaker 204 is configured to control dispenser disconnect 208 such that switching overcurrent protection breaker 204 to an off position causes dispenser disconnect 208 to disconnect all conductors electrically connected to dispenser disconnect 208. Fuel panel assembly 110 also includes a system disconnect 116 configured to selectively connect and disconnect a main power supply received by fuel panel assembly 110. The aforementioned components of fuel panel assembly 110 are disposed within the single control panel enclosure 124. Fuel panel assembly 110 may also include a programmable logical controller, a step-down transformer, switches, terminal strips, internal wiring, and other electrical components to facilitate operation.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description and claims and is not admitted to be prior art by inclusion in the background section.

What is claimed is:

1. A fuel dispensing system, comprising:
a plurality of fuel dispensers;
at least one tank configured to store fuel;
at least one pump configured to pump the fuel from the tank to at least one of the fuel dispensers; and
a fuel panel assembly configured to supply electric power to each of the fuel dispensers, the fuel panel assembly comprising:
a plurality of overcurrent protection breakers, each overcurrent protection breaker provided for one of the fuel dispensers; and
a plurality of disconnect devices, each disconnect device provided for one of the fuel dispensers;
wherein the fuel panel assembly is provided within a single control panel enclosure.

2. The fuel dispensing system of claim 1, wherein the fuel panel assembly further comprises a system disconnect configured to disconnect power to each of the fuel dispensers.

3. The fuel dispensing system of claim 1, wherein each of the plurality of disconnect devices is configured to disconnect all conductors to a corresponding fuel dispenser.

4. The fuel dispensing system of claim 1, wherein the fuel panel assembly further comprises a control device, and wherein the system disconnect disconnects power in response to a control signal input received from the control device.

5. The fuel dispensing system of claim 4, wherein the control device is a programmable logic controller.

6. The fuel dispensing system of claim 4, wherein the control device is a pushbutton switch.

7. The fuel dispensing system of claim 1, wherein the control panel enclosure has a NEMA 3R or 4 rating.

8. A fuel panel assembly configured to provide electric power to a plurality of fuel dispensers, the fuel panel assembly comprising:
a plurality of overcurrent protection breakers, each overcurrent protection breaker provided for one of the fuel dispensers; and
a plurality of disconnect devices, each disconnect device provided for one of the fuel dispensers;
wherein the fuel panel assembly is provided within a single control panel enclosure.

9. The fuel panel assembly of claim 8, wherein the fuel panel assembly further comprises a system disconnect configured to disconnect power to each of the fuel dispensers.

10. The fuel panel assembly of claim 8, wherein each of the plurality of disconnect devices is configured to disconnect all conductors to a corresponding fuel dispenser.

11. The fuel panel assembly of claim 8, wherein the fuel panel assembly further comprises a control device, and wherein the system disconnect disconnects power in response to a control signal input received from the control device.

12. The fuel dispensing system of claim 11, wherein the control device is a programmable logic controller.

13. The fuel dispensing system of claim 11, wherein the control device is a pushbutton switch.

* * * * *